Aug. 7, 1923.
J. R. CRISP
LEVEL
Filed Dec. 30, 1921    2 Sheets-Sheet 1
1,464,467
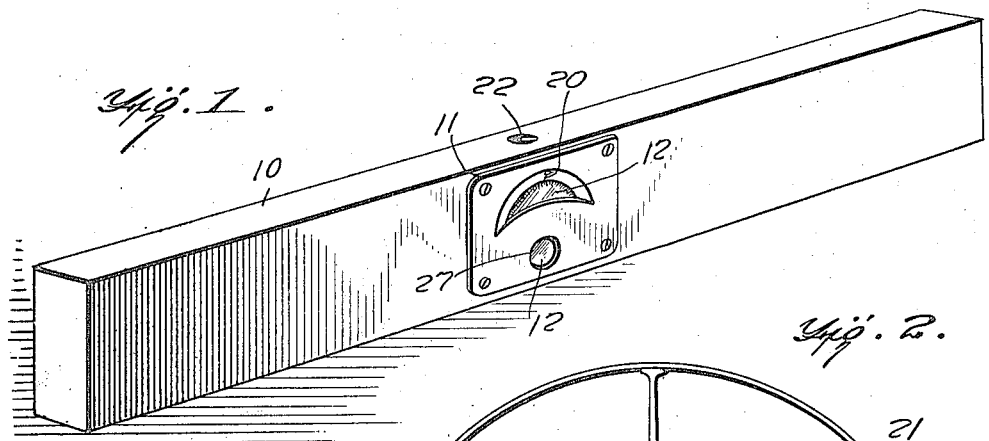
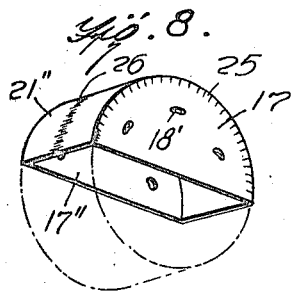
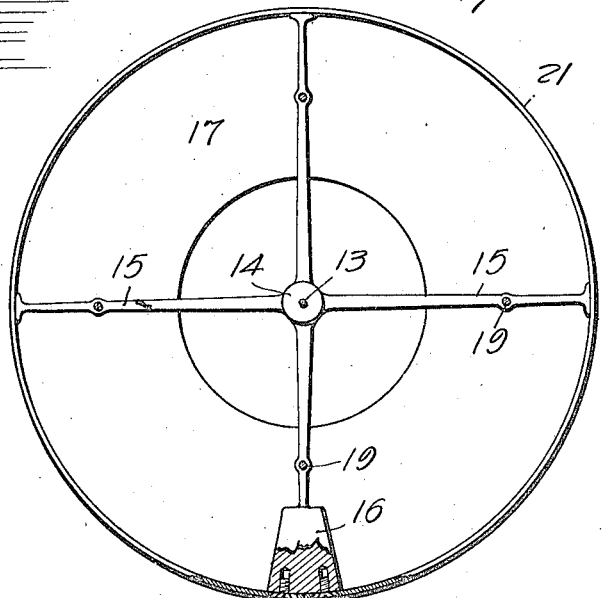
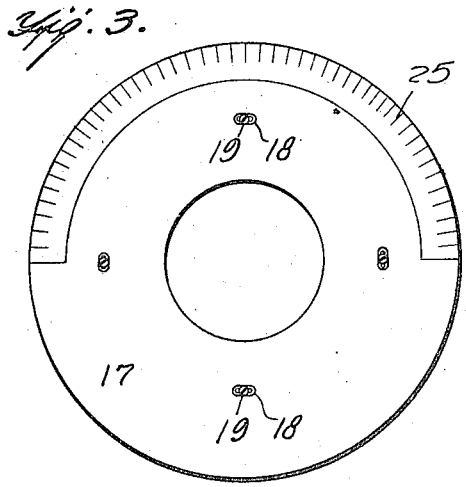
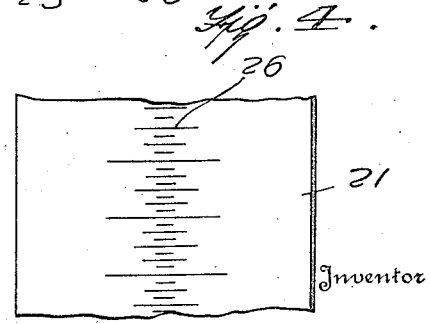
Inventor
JOSEPH R. CRISP,
By Franklin H. Hough
Attorney Aug. 7, 1923.  1,464,467
J. R. CRISP
LEVEL
Filed Dec. 30, 1921   2 Sheets-Sheet 2
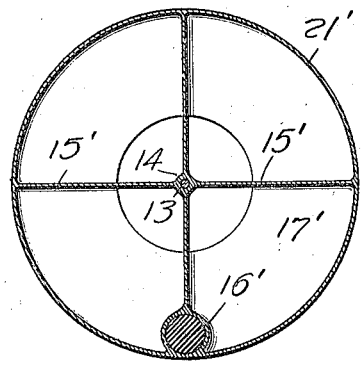
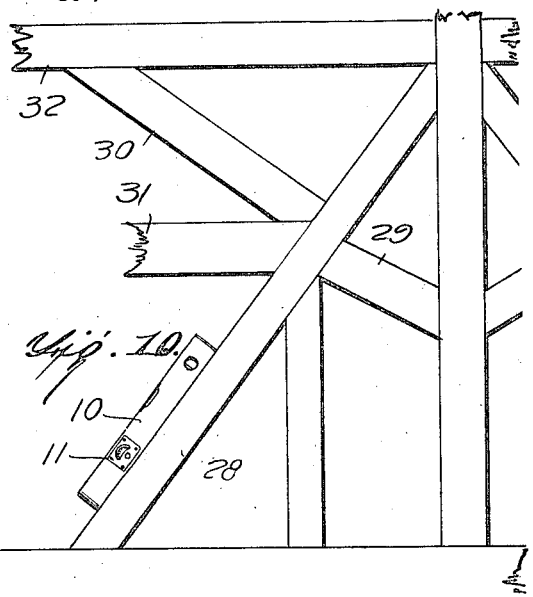
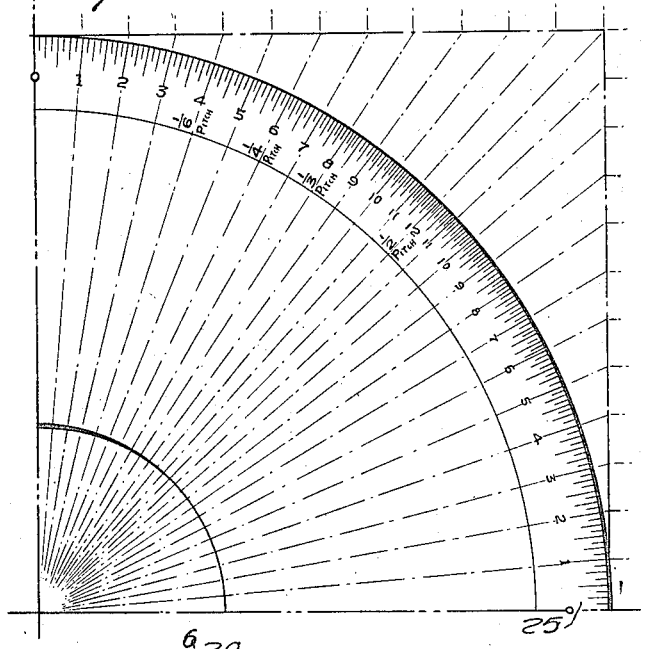
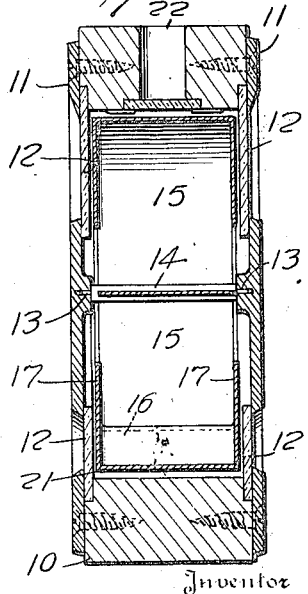
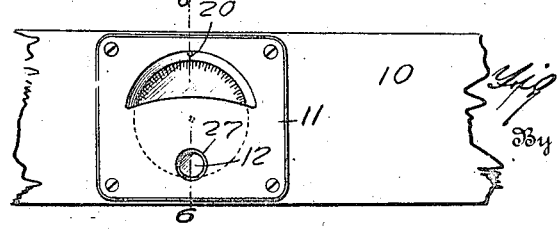
Inventor
JOSEPH R. CRISP,
By Franklin H. Hough
Attorney Patented Aug. 7, 1923.

1,464,467

UNITED STATES PATENT OFFICE.

JOSEPH R. CRISP, OF ALMOND, NORTH CAROLINA, ASSIGNOR OF ONE-HALF TO A. L. EPPS, OF ALMOND, NORTH CAROLINA.

LEVEL.

Application filed December 30, 1921. Serial No. 525,989.

*To all whom it may concern:*

Be it known that I, JOSEPH R. CRISP, a citizen of the United States, residing at Almond, in the county of Swain and State of North Carolina, have invented certain new and useful Improvements in Levels, of which the following is a specification, reference being had therein to the accompanying drawings.

This invention relates to mechanics' levels and has for an object to provide a level of the inclinometer or pendulum type having improved features of reliability, accuracy, convenience and economy of construction and upkeep.

A further object of the invention is to provide a pendulum type of level having improved means for reading from a scale inches rise to foot run, whereby the rise in unit length of a given surface may be determined and translated into inches for cutting timbers or the like by the use of the ordinary mechanic's square.

A further object of the invention is to provide a level of the pendulum type having improved rotor within the level structure carrying the calibrated scale in improved addedly secure manner.

With these and other objects in view the invention comprises certain novel parts, elements, units, constructions, arrangements, combinations, functions and accessories, as disclosed in the drawings, together with mechanical and functional equivalents thereof, as will be hereinafter more fully described and claimed.

In the drawings:

Figure 1 is a perspective view of one embodiment of the improved level;

Figure 2 is a view in elevation of the rotor of the preferred type with one of the calibrated disks removed;

Figure 3 is a view in side elevation of the removed calibrated disk;

Figure 4 is a fragmentary view in plan of the circumferential band providing an added position for reading the exhibited scale;

Figure 5 is a view in side elevation of a fragment of the level showing the housing for maintaining the operating parts in position;

Figure 6 is a transverse sectional view taken on line 6—6 of Figure 5;

Figure 7 is a sectional view perpendicular to the axis of a different embodiment of the rotor showing the structure cast or molded integral, as distinguished from built-up, as shown in the type at Figure 2;

Figure 8 is a perspective view of one of the segments of a covering employed upon the spokes of the type shown at Figure 2, in place of disks and band cast or formed separately;

Figure 9 is an enlarged detail view of the preferred scale appearing upon the disks and indicating, as shown, inches rise to foot run, and Figure 10 is a view in side elevation of a conventional association of timbers showing the utility of the device in determining inclination which, by the employment of the scale shown at Figure 9, may be converted into the scale appearing upon the ordinary mechanic's square, whereby the timber may be cut to the proper angle irrespective of the inclination of the several timbers or parts to which it is connected at its extremities.

Like characters of reference indicate corresponding parts through the several views.

The improved level which forms the subject matter of this application is mounted in conjunction with a bar 10 of substantially the usual and ordinary type and may be, and preferably will be, mounted at the middle of said bar, as shown at Figure 1, although it is obvious that it may be otherwise mounted, as indicated at Figure 10.

The bar 10, at the point at which the rotor is to be journaled, is provided with a frame 11 which serves as a keeper for one or more transparent members, as the sheets of glass 12. Preferably also, as indicated at Figure 6, the opening will be entirely through the bar so that two of the frames 11 and the corresponding transparent sheets will be employed.

The frame 11 also provides means for journaling the staff 13 which is surrounded by a hub 14 from which extend a plurality of spokes. These spokes may be as shown at 15 in Figure 2, or at 15' in Figure 7, the difference of which will be explained hereafter. In any case at the extreme of one of said spokes a weight 16 or 16' will be provided. It is obvious that the weight 16 will be of heavy material, such, for instance, as lead, while the spokes 15 or 15' preferably be of very light material, such for instance as aluminum, although the particular materials are wholly matters of choice and experience. The spokes 15 or 15' will carry disks 17 or 17', the former being in the form of separate annuli, one upon either side of the spokes which are wide enough to extend entirely across the width of the rotor. Preferably these disks 17 will be provided with slots 18 which will be secured by means of screws 19 to the spokes 15, to thereby permit the rotary adjustment for accuracy in bringing the zero points of said disks normally to coincide with the pointer 20 carried upon the frame 11. As has been heretofore stated, one of these annuli 17 is employed upon each side or the disks may be cast or formed integral with the spokes, as indicated at 17' at Figure 7.

About the extremities of the spokes 15 a band 21 is employed which band is visible through an opening 22 in the side of the bar 10, as indicated more particularly at Figures 1 and 6. When the band 21 is formed as a separate entity, it preferably has its ends brought together under the weight 16, as shown more particularly at Figure 2 and provided with slots 23 in its extremities engaged by screws 24 which permits the circumferential adjustment of the band about the extremities of the spokes for the purpose of adjusting to accuracy. Instead of forming this band 21 as a separate entity, it may be cast or formed integral with the spokes 15' and the disks 17', as shown at Figure 7, in said figure carrying the numeral 21'. Also the disks and band may be formed in segments, as shown at Figure 8, wherein the segmental disks 17'' and the segmental band 21'' are cast, formed or molded as an integral cap to be inserted over the spokes and secured adjustably by means of slots 18'.

In any case and whatever the relation of the disks, the band and the spokes, the disks are provided with a calibrated scale 25 which will preferably be graduated, as shown at Figure 9 to indicate inches rise to foot run, also to indicate from between 45° and vertical, the pitch as ordinarily employed for cutting rafters for buildings, this being one of the utilities to which the level is particularly adapted. Also the bands 21, 21' or 21'' will have a like graduated scale 26, as shown at Figure 4 being also preferably graduated in inches rise to foot run to correspond to the graduations of the segmental scale 25. It will be apparent, therefore, that the device at any inclination will by the position of the rotor indicate the inclination of the bar 10, which inclination can be read in inches rise to foot run from either side through the glass 12 or from the top through the opening 22. It will be noted, especially from Figures 1 and 5 that a small circumferential opening is also provided through the plates 11 opposite the crescent opening, which said opening is indicated at 27, so that in case the bar 10 is reversed or turned upside-down the scale may still be read through this opening 27 as the rotor will always maintain its plumb position irrespective of the position of the bar and in case of the inversion of the bar, the scale may be read as conveniently through said opening 27 as otherwise..

At Figure 10 a number of connected timbers are shown with the level placed thereon. From the position of the level as shown in that figure, it is obvious that the bar 28 upon which the level is placed will impart to the level its own inclination from the horizontal and that the rotor maintaining its plumb position, will indicate by the relation of the scales 25 or 26 with the pointers the exact number of inches and fraction rise to foot run. The same, of course, is true in regard to any of the other timbers 29, 30 and the like. It is obvious that the level may be placed under a timber as well as upon the top and that in the case of a timber supposedly horizontal or supposedly vertical, which is inclined from the truly horizontal or vertical, the condition will be instantly apparent and a connecting brace may be cut to correspond with the actual inclination of the timber, instead of the supposed verticality or horizontality. In fact, by the use of a level of the type noted, carrying a rotating scale indicating inches rise to foot run any deviation from the horizontal can be instantly determined by merely applying the level to the part and once determined the mechanic may accurately and with assurance cut the angle upon his timber to fit the position for which it is intended.

What I claim is:

1. A level comprising a bar having a plurality of openings, plates secured over the openings, a staff journaled in and extending between the plates, a rotor carried by the shaft and presenting a plurality of radially extending spokes, a calibrated band positioned as a rim about and movable relative to the extremities of the spokes and visible through an opening and calibrated disks carried by the opposite sides of the spokes and visible through other of said openings.

2. A level comprising a bar having an opening therethrough, plates secured over and covering the opposite sides of the opening, a staff journaled in and extending between the plates, a hub upon the staff, a plurality of spokes extending radially from the hub equal distances and having their extremities substantially coinciding with the walls of the opening in the bar, a band carried adjustably upon the extremities of the spokes and forming a rim thereabout, disks carried upon the opposite sides of the spokes, and a weight at the extremity of one of said spokes.

3. A level comprising a bar having an opening therethrough, plates covering the ends of the opening, a staff journaled in and extending between the plates, a hub mounted upon the staff, spokes extending radially from the hub equal distances, a calibrated band positioned about the extremities of the spokes and forming a rim, means permitting the circumferential adjustment of the band relative to the spokes, disks carried by the opposite sides of the spokes and having their perimeters coinciding substantially with the edges of the band, means permitting the circumferential adjustment of the disks relative to the spokes, and a weight formed at the extremity of one of said spokes.

4. A level comprising a bar having an opening therein, a rotor journaled within the opening, said rotor comprising a hub, a plurality of spokes radially extending therefrom, a band extending about the extremities of said spokes, means permitting the adjustment of the band circumferentially relative to the spokes, a disk carried by the spokes having its perimeter substantially coinciding with the edge of the band and circumferentially adjustable relative to the spokes and band, and a weight formed at the extremity of one of said spokes.

In testimony whereof I hereunto affix my signature.

JOSEPH R. CRISP.